Reissued Feb. 25, 1941

Re. 21,731

UNITED STATES PATENT OFFICE 21,731

METHOD OF PRODUCING A HARD METAL ALLOY

Paul Schwarzkopf, Yonkers, N. Y., assignor to American Cutting Alloys, Inc., New York, N. Y., a corporation of Delaware No Drawing. Original No. 2,170,433, dated August 22, 1939, Serial No. 164,166, September 16, 1937. Application for reissue August 6, 1940, Serial No. 351,639. In Germany May 16, 1929

8 Claims. (Cl. 75—137)

This invention refers to a hard metal tool alloy and method of producing the same.

This invention forms a continuation in part of my copending application Ser. No. 727,781, filed May 26, 1934, and of my copending application Ser. No. 743,717, filed September 12, 1934 and issued into Patent No. 2,122,157, which were in turn copending with my application Ser. No. 656,103, filed February 10, 1933 and issued into Patent No. 1,959,879, and my application Ser. No. 625,042, filed July 27, 1932 and issued into Patent No. 2,091,017, which were in turn copending with my application Ser. No. 452,132, filed May 13, 1930 and I of course do not claim herein anything which is subject matter of the claims in my above mentioned earlier patents.

It is an object of the invention to increase the hardness of such hard metal tool alloys without impairing their toughness.

It is another object of the invention to increase the resistance of such hard metal tool alloys against mechanical wear and chemical effects such as of the oxygen of the surrounding air, or moisture, or a cooling liquid such as water.

It is another object of the invention to adjust the heat conductivity of the hard metal tool alloy without impairing its hardness or resistance against oxidation.

It is still another object of the invention to increase the speed at which hard alloys of this kind can be used for cutting, drilling, milling, and other machining purposes.

This and other objects of the invention will be more clearly understood when the specification proceeds.

Hard metal tool alloys have been made of tungsten carbide and auxiliary metal taken substantially from the iron group, in amounts from about 3% to 20%. The tungsten carbide has been finely powdered and mixed with the auxiliary metal, and the mixture heated to sintering temperature. Such hard metal tool alloys could be utilized for machining cast iron but do not prove efficient in high speed machining steel and other compositions of metal.

In contradistinction hereto the invention proceeds from fundamentally new considerations. It no longer uses one carbide alone, viz. tungsten carbide, and cements it by auxiliary metal in the heat.

The present invention particularly refers to a method of producing a hard metal composition, comprising a consolidated product consisting substantially of about 3% to 22% auxiliary metal essentially of the iron group, and at least two carbides of tungsten, molybdenum (i. e. an element of the sixth group of the periodical system), boron (i. e. an element of the third group of the periodical system), titanium (i. e. an element of the fourth group of the periodical system) and vanadium (i. e. an element of the fifth group of the periodical system) and in general of at least two hard carbides of different elements selected from the third through sixth groups of the periodical system. The invention comprises the steps of comminuting, preferably as finely as possible, at least two hard carbides selected from carbides of different elements of the third through sixth groups of the periodical system, admixing the selected carbides in substantial amounts, including a minimum of 1% of a selected carbide, with auxiliary metal essentially of the iron group in amounts of about 3% to 22%, shaping and preferably pressing the mixture and finally alloying it by sintering it into a hard and tough body and until in substantial amount solid solutions of homogeneous carbide crystal structures are formed therein, each of which contains atoms of two (or more) selected elements capable of forming such structures, in addition to atoms of carbon required to form carbide with those elements. Experiments have shown and science has given the rule that the hardness of solid solutions of elements is a function of their proportion, and that this function possesses a maximum. It is particularly advantageous to choose for use in the present invention homogeneous carbide crystal structures as defined above exhibiting approximately maximum hardness and thereby increase the overall or average hardness of the composition.

Let me take the rules given by the science based on the investigations of Kurnakow and Zemczuzny in the "Zeitschrift für anorganische Chemie" 1908, volume 60, page 1, and 1910, volume 68, page 136, referred to in the standard book of Reinglass "Chemische Technologie der Legierungen", second edition, page 52, 53, and in the "Metall- und Legierunskunde" of Dr. M. v. Schwarz, Professor of the College at Munich, second edition (1929), page 49, where the investigations of Kurnakow are referred to and it is verbatim stated:

"In an uninterrupted series of mixed crystals i. e. solid solutions the curve of hardness increases with the concentration gradually up to a flat maximum, which lies mostly at the simple atomic composition." If Schwarz says "atomic composition," it is to be considered that he mentions metals and not chemical compounds such as carbides. If such compounds are to be used, then instead of "atoms," which exist only of the pure metals, the "molecules" are to be taken, because they are in compounds equivalent to the atoms of the pure metal.

Furthermore, science says that the maximum does not always lie at simple molecular proportions. If one element materially exceeds another element in hardness, then the maximum of hardness is "shifted" in favor of the harder element in the solid solution and consequently two (or three) atoms form together with one atom of the softer element the solid solution of greatest hardness. By analogy, according to the invention the carbides are to be present approximately in integer number ratios of their molecular weights, the higher ratio applying to the relatively harder carbide, if one of the composed carbides is harder than the other. Lastly, if a curve of hardness of solid solutions is built up depending on the content of the respective carbides, then the maximum of the curve is flat and does not form a tip so that solid solutions of about greatest hardness are practically also obtained if deviating by about 5% to 10% to both sides from the theoretical molecular proportion corresponding to greatest hardness.

Let me take an alloy having 10% auxiliary metal and therefore 90% carbide. Let me further assume that tungsten-carbide and titanium-carbide are to be compounded to form the hardest composition. Then we have to divide these 90% in the proportion of 60:196, this means that we have to take about 20% (by weight) titanium-carbide, about 70% tungsten-carbide and about 10% auxiliary metal.

Let me take molybdenum-carbide and titanium-carbide. Titanium-carbide is exceedingly hard, at least considerably harder than molybdenum-carbide and is furthermore very light. Consequently the optimum of hardness is to be expected at a proportion of about 1:3. At 1:3 we have about 49.5 (that means less than 50%) molybdenum-carbide and 40.5% titanium-carbide, if 10% auxiliary metal is present.

Let me take vanadium-carbide (carbide of the fifth group) and titanium-carbide (carbide of the fourth group). Considering that titanium-carbide exceeds vanadium-carbide in hardness, the molecular proportion is to be chosen with about 1:2 and consequently the hard metal will contain about 60% titanium carbide and about 30% vanadium carbide in order to remain within the range of hardest compositions, if 10% auxiliary metal are present.

Let me take, as last example, boron carbide (of the third group) and titanium carbide (of the fourth group). Boron carbide is known as one of the hardest carbides. The boron carbide is investigated as $B_6C$ with a molecular weight of 78. Assuming that the hardness of both carbides is about the same, the solid solution has to be made of about equal proportion of about 78:60. Consequently, an alloy will contain about 50% boron carbide and about 40% titanium carbide, if 10% auxiliary metal are present.

Hard metals of the above compositions particularly exhibit high resistance against oxidation at elevated temperature, great hardness and relatively low specific weight.

In the examples given 10% auxiliary metal is chosen only for the sake of uniformity. But the amount of auxiliary metal essentially of the iron group may vary between about 3% and 22%. The amount may be smaller if heavy mixtures of carbides (e. g. tungsten-, molybdenum carbide) are concerned and larger if lighter mixtures of carbides (e. g. with titanium carbide) are concerned.

As a consequence of the considerations presented, the following compositions selected admixed and compounded according to the invention exhibit great hardness: 10% to 20% vanadium carbide, 85% to 65% tungsten carbide, 5% to 20% auxiliary metal; 50% to 70% titanium carbide, 45% to 25% vanadium carbide, 5% to 25% auxiliary metal; 60% to 40% titanium carbide, 55% to 35% boron carbide, 5% to 25% auxiliary metal; 10% to 25% titanium carbide, 75% to 55% tungsten carbide, 5% to 20% auxiliary metal; 35% to 60% tantalum carbide, 35% to 60% tungsten carbide, 5% to 20% auxiliary metal; 70% to 90% tantalum carbide, 5% to 25% vanadium carbide, 5% to 20% auxiliary metal; 65% to 85% tantalum carbide, 10% to 30% columbium carbide, 5% to 20% auxiliary metal; 25% to 40% vanadium carbide, 55% to 70% columbium carbide, 5% to 20% auxiliary metal.

For special purposes, e. g. for finest cuts or polishing mixtures of titanium carbide and molybdenum carbide in about equal proportions forming substantially homogeneous carbide crystal structures or solid solutions and nickel up to 9% and 15% and chromium up to 1% and 2% as auxiliary metals has been proven advantageous.

If solid solutions of more than two carbides are to be contained in the composition, one proceeds with advantage in such a way that first at least two groups of binary solid solutions are formed, each group comprising different carbides, whereupon these groups are combined into ternary or quaternary solid solutions and by sintering in the presence of the auxiliary metal. Those groups of solid solution are preferably formed before addition of substantial amounts of auxiliary metal.

It is satisfactory for the invention if only substantial amounts of homogeneous carbide crystal structures or solid solutions are produced. According to experience already about 10% of the hard metal alloy formed by those structures are capable to considerably improve the properties of the hard metal. Auxiliary metal may be present in amounts of from about 3% to 25% and essentially, i. e. completely or almost completely taken from the iron group.

It is quite difficult to mention any minimum amount of carbide to be present, because 5% titanium-carbide occupy a space four times as large as 5% by weight of tungsten-carbide. Nevertheless, the minimum amount of carbide to be present and forming part of homogeneous carbide crystal structures or solid solutions has to be substantial, and as a minimum, about 1% by weight of the alloy.

The carbides produced are, if needed, powdered and intimately and uniformly mixed with the chosen auxiliary metal or metals. The mixtures are then preformed by pressing in suitable moulds to a shape similar to the desired shape. The shrinking which takes place during the following treatment must be taken into calculation.

An electric furnace can be employed for effecting the heating and sintering; the sintering may also be carried out by means of high frequency currents. In some cases particularly good results are obtained by carrying out the heating or sintering in a vacuum.

The temperature of the body is to be elevated to about 1400° to 1600° C. and this heat-treatment is to be continued for about one or several hours, or a major part of one hour, till the desired structure according to the invention is produced.

Generally, the body according to my invention is consolidated by using auxiliary metals of the kind and in the amounts as mentioned before and sintering it at elevated temperature, e. g. in the range up to about 1400° C. to 1600° C. until solid solutions or homogeneous carbide crystal structures as hereinbefore defined, are formed.

In case, however, difficult forms of the body are to be produced not achievable by usual moulds, or in case sharp edges are desired, or angles difficult to manufacture in such a way, so that the mechanical working or finishing of the hard metal body is needed after sintering, then the following way is preferable.

The pressed and preformed body is to be submitted to sintering temperatures as mentioned before, but such sintering should be done during a short period of time only, say for 1 to 5 to 10 minutes so that the particles are sufficiently fritted together to withstand mechanical treatment without presenting, however, the hardness of a fully sintered body. Such a body is then subjected to finishing in any way and then the sintering at the same temperature is continued until the sintered body answering the invention is achieved.

When I refer in the appended claims to carbide of elements selected from the third, fourth, fifth and sixth group of the periodical system, I mean carbides adapted for use in hard tool elements, having a suitable hardness and not being dissolved by water or other liquid employed for cooling or similar purposes at operation temperatures. Such carbides are boron-carbide (belonging to the third group), titanium-carbide (belonging to the fourth group), vanadium-carbide, columbium carbide, tantalum-carbide (belonging to the fifth group), and tungsten-carbide, molybdenum-carbide (belonging to the sixth group).

Tool alloys prepared according to the invention are, as a rule, not used for the production of the entire tool, but merely for the part of the tool which in practice is used directly for cutting, drilling, etc. and which is subject to wear.

From the above description it appears that the carbides are compounded entirely or in substantial amount into solid solutions or homogeneous carbide crystal structures as hereinbefore defined, in the presence of auxiliary metal essentially of the iron group and by heat treatment to sufficient extent, while cementing of the composition is effected. It has been found that homogeneous carbide crystal structures or solid solutions resist re-crystallization to a great extent. Thereby finest grain of carbides present in the alloy including those structures is retained, and a tough and very efficient, clean cutting material is obtained.

If carbides highly resistant to oxidation and other carbides less resistant to oxidation are thus compounded according to the invention into solid solutions or homogeneous carbide crystal structures as hereinbefore defined, the resistivity of those structures against oxidation surpasses that of the carbide of originally lower resistivity.

What I claim is:

1. In a method of producing a hard metal alloy, in particular for tool elements and other working appliances, the steps of comminuting as finely as possible at least two hard carbides of different elements selected from the third through sixth group of the periodical system, admixing said comminuted carbide in substantial amounts, including a minimum of 1% of a selected carbide, with auxiliary metal essentially of the iron group in amounts of about 3% to 22%, shaping said mixture and finally alloying it by sintering into a hard and tough body and until solid solutions of said selected carbides are formed therein in substantial amount.

2. In a method of producing a hard metal composition, in particular for tool elements and other working appliances, the steps of finely comminuting at least two hard carbides of different elements selected from the third through sixth group of the periodical system, admixing said comminuted carbides in substantial amounts, including a minimum of 1% of a selected carbide, with auxiliary metal essentially of the iron group in amounts of about 3% to 22%, shaping and pressing said mixture and finally alloying it by sintering into a hard and solid body and until solid solutions of said selected carbides are formed therein in substantial amount.

3. In a method of producing a hard metal alloy, in particular for tool elements and other working appliances, the steps of comminuting as finely as possible at least two hard carbides of different elements selected from the third, fourth, fifth and sixth group of the periodical system, admixing said comminuted carbides in substantial amounts, including a minimum of 1% of a selected carbide, with auxiliary metal essentially of the iron group in amounts of about 3% to 22%, shaping said mixture and finally alloying it by sintering into a hard and tough body and until solid solutions of said selected carbides are formed in substantial amount and increase thereby the average hardness of the alloy.

4. In a method of producing a hard metal alloy, in particular for tool elements and other working appliances, the steps of comminuting as finely as possible at least two hard carbides of different elements selected from the third, fourth, fifth and sixth group of the periodical system, admixing said comminuted carbides in substantial amounts, including a minimum of 1% of a selected carbide, with auxiliary metal essentially of the iron group in amounts of about 3% to 22%, shaping and pressing said mixture and finally alloying it by sintering into a hard and tough body and until substantial amounts of said selected carbides form solid solutions and increase thereby the average hardness of the alloy.

5. In a method of producing a hard metal composition, particularly for tool elements and other working appliances, the steps of selecting and finely comminuting at least two hard carbide crystal structures formed from carbon and different element selected from at least two different groups of the periodical system the third through sixth group thereof, admixing the comminuted carbide structures in substantial amounts, including a minimum of about 1% of a selected carbide structure, with auxiliary metal essentially of the iron group in amounts of about 3% to 22%, shaping said mixture and finally compounding it by sintering at temperatures between about 1400° and 1600° C. until a hard and tough body and substantial amounts of homogeneous carbide crystal structures are obtained therein containing atoms of at least two elements selected from said groups in addition to carbon atoms.

6. In a method of producing a hard metal composition, particularly for tool elements and other working appliances, the steps of selecting and comminuting as finely as possible at least two carbide crystal structures formed from carbon and different elements selected from the group consisting of boron, titanium, vanadium, columbium, tantalum, tungsten, molybdenum, admixing the comminuted carbide structures in substantial amounts, including a minimum of about 1% of a selected carbide structure, with auxiliary metal essentially of the iron group in amounts of about 3% to 22%, shaping said mixture and finally compounding it by sintering at temperatures between about 1400° and 1600° C. until a hard and tough body and substantial amounts of homogeneous carbide crystal structures are obtained therein containing atoms of at least two elements selected from said group in addition to carbom atoms, and the average hardness of the composition is increased thereby.

7. In a method of producing a hard metal composition, in particular for tool elements and working appliances, the steps of finely comminuting a carbide crystal structure containing titanium in addition to carbon and another carbide crystal structure containing tungsten in addition to carbon, admixing said comminuted carbide structures in substantial amounts, including a minimum of 1% of a carbide structure, with auxiliary metal essentially of the iron group in amounts of about 3% to 22%, shaping said mixture and finally compounding it by sintering into a hard and tough body until substantial amounts of homogeneous carbide crystal structures are obtained therein, containing atoms of titanium and tungsten in addition to carbon atoms.

8. In a method of producing a hard metal alloy, in particular for tool elements and working appliances, the steps of comminuting as finely as possible at least two hard carbides of different elements selected from at least two different groups of the periodical system the third through sixth group thereof, admixing said comminuted carbides in substantial amounts, including a minimum of 1% of a selected carbide, and in proportions suitable to yield approximately hardest homogeneous carbide crystal structures containing atoms of at least two elements selected from said groups in addition to carbon atoms, with auxiliary metal essentially of the iron group in amounts of about 3% to 22%, shaping said mixture and finally alloying it by sintering into a hard and tough body and until said crystal structures are formed in substantial amount.

PAUL SCHWARZKOPF.